United States Patent
Moizard et al.

(10) Patent No.: US 7,708,434 B2
(45) Date of Patent: May 4, 2010

(54) METHOD FOR THE AUTOMATIC ADAPTATION OF A LIGHT BEAM OF A HEADLIGHT DEVICE

(75) Inventors: Julien Moizard, Paris (FR); Benoît Reiss, Eaubonne (FR); Pierre Albou, Paris (FR); David Bourdin, Livry Gargan (FR)

(73) Assignee: Valeo Vision, Bobigny (FR)

( * ) Notice: Subject to any disclaimer, the term of this patent is extended or adjusted under 35 U.S.C. 154(b) by 235 days.

(21) Appl. No.: 11/941,300

(22) Filed: Nov. 16, 2007

(65) Prior Publication Data

US 2008/0117642 A1 May 22, 2008

(30) Foreign Application Priority Data

Nov. 17, 2006 (FR) .................................. 06 10088

(51) Int. Cl.
*B60Q 1/08* (2006.01)
(52) U.S. Cl. ....................... 362/466; 362/464
(58) Field of Classification Search ............... 362/466, 362/464
See application file for complete search history.

(56) References Cited

U.S. PATENT DOCUMENTS

| | | |
|---|---|---|
| 5,138,540 A | 8/1992 | Kobayashi et al. |
| 5,645,338 A | 7/1997 | Kobayashi |
| 6,343,869 B1 | 2/2002 | Kobayashi |
| 6,497,503 B1 | 12/2002 | Dassanayake et al. |
| 6,547,425 B2 * | 4/2003 | Nishimura .................. 362/466 |
| 6,572,248 B2 * | 6/2003 | Okuchi et al. ............... 362/464 |
| 6,960,005 B2 | 11/2005 | Daicho et al. |
| 2002/0196636 A1 | 12/2002 | Dassanayake et al. |
| 2004/0052083 A1 | 3/2004 | Daicho et al. |

FOREIGN PATENT DOCUMENTS

| | | |
|---|---|---|
| DE | 4439556 A1 | 5/1996 |
| DE | 19716784 A1 | 10/1998 |
| DE | 10355757 A1 | 6/2005 |
| DE | 102004063836 A1 | 3/2006 |
| DE | 19758664 B4 | 7/2006 |
| EP | 1283127 A2 | 2/2003 |
| FR | 2726518 A3 | 5/1996 |
| FR | 2762268 A1 | 10/1998 |
| WO | 03053737 A1 | 7/2003 |

* cited by examiner

*Primary Examiner*—Ali Alavi
(74) *Attorney, Agent, or Firm*—Jacox, Meckstroth & Jenkins

(57) ABSTRACT

A proposed method to illuminate optimally, or at least in an improved fashion compared with existing solutions, a road taken by a vehicle in question implementing the method whilst ensuring that other vehicles are not dazzled. To this end, it is not proposed in the invention to detect the distance between the vehicle in question and the first vehicle liable to be dazzled by the vehicle in question, and to generate accordingly a light beam optimized in terms of range on the road, and advantageously light intensity; according to the invention, the optimization of the light beam produced is achieved by the use of the motorway function available on the vehicle in question. The use of this function in this context also ensures a gradual transition between the function of the dipped type and the function of the main-beam type in the context of automatic switching operations between these functions.

26 Claims, 2 Drawing Sheets

ND FOR THE AUTOMATIC
METHOD FOR THE AUTOMATIC ADAPTATION OF A LIGHT BEAM OF A HEADLIGHT DEVICE

BACKGROUND OF THE INVENTION

1. Field of the Invention

An object of the present invention is a method for the automatic adaptation of a light beam emitted by a headlight device, in particular for a motor vehicle. An essential aim of the invention is to automatically optimize, according to the traffic observed on a road, the illumination generated by a vehicle following the road, in particular by offering a light beam, the performance and/or characteristics of which, in terms of range and light intensity, lie between those of the light beams produced by the headlight devices performing a dipped-beam function and those of the light beams produced by headlight devices performing a main-beam function.

2. Description of the Related Art

The field of the invention is, in general terms, that of motor vehicle headlights. In this field, various types of conventional lighting devices are known, among which there are essentially:

sidelights, with low intensity and range;

passing, or dipped-beam lights, with a higher intensity and range on the road of around 60 meters, which are used essentially at night and where the distribution of the light beam is such that it makes it possible not to dazzle the driver of a vehicle being passed;

long-range main-beam lights, whose area of vision on the road is around 200 meters, and which must be switched off when passing another vehicle in order not to dazzle its driver;

fog lights, etc. . . .

In addition, an improved type of headlight is known, called dual-function headlights, which combine the functions of dipped lights and long-range lights: for this purpose, it is possible for example to arrange inside the dual-function headlight a removable cover, consisting for example of a metal plate, able to move on command from a first position in which it does not obscure the light signal produced by the light source of the headlight, the range of the headlight then corresponding to that of main beams, to a second position in which it obscures part of the light signal produced by the light source of the headlight, the range of the headlight then being limited to that of a dipped light. The headlight must, in the second position, generate a beam with regulatory cutoff corresponding to a beam of the conventional dipped type, the form of the cutoff being given by the form of the shield intercepting part of the light signal. This example embodiment is principally used in headlight devices of the elliptical type.

However, the conventional headlight devices that have just been mentioned, more particularly those that are used as dipped lights, produce light beams that are open to improvement when the headlight devices are used under certain conditions in order to improve the driving comfort.

Thus, when a vehicle is on a motorway, it is judicious to lift the cutoff line compared with that of the beam of a conventional dipped type, and to concentrate the light flux of the dipped light at the optical axis of the headlight device; the beam produced is thus effectively carried a little further. On the contrary, when a vehicle is traveling in the town, it is not necessary to make the light beam carry as far as on a clear road.

Thus, in addition to the conventional principal headlight functions, in particular dipped and main beam, various improvements have progressively appeared. Thus elaborate functions, or advanced functions, have been seen to develop, known by the term AFS functions (standing for Advanced Front light System in English), which slightly modify the positioning of the cutoff of the light beam produced, and possibly its distribution in terms of light intensity, among which there is in particular a function known as Motorway Light in English, meaning motorway light. This function provides an increase in the range of a dipped light, in particular by increasing the light intensity of the beam that it generates at several points in space and by presenting a cutoff line that is raised with respect to that of a conventional dipped beam. In addition, the maximum authorized illumination level changes, in Europe, from 70 lux to 120 lux.

FIG. 1 depicts, by way of example and schematically, three theoretical projections onto a flat surface of various light beams that have just been mentioned. The beams shown correspond to those existing in countries where driving takes place on the right-hand side of the road. The beams corresponding to driving on the left are obtained by simple symmetry. The flat projection surface is disposed facing the headlight device in question, perpendicular to its optical axis. The grey-tinted part of these projections corresponds to an absence of light in the corresponding area in space, the part left white corresponding to an area in space illuminated in a regulatory fashion by means of the headlight device in question.

In this way a first theoretical cutoff line 101 has been shown, corresponding to a dipped beam, a second theoretical cutoff line 102, corresponding to a motorway beam, and a third theoretical cutoff line 103, corresponding to a main beam. The horizon line 104 is shown in broken lines. The theoretical cut-off line of the beam of the dipped type, and respectively of the beam of the motorway type, consists of:

a first part 111, and respectively 121, which takes the form of a first horizontal flat segment disposed below the horizon line 104; in the case of the beam of the dipped type, the projection angle observed between the horizon line and the first segment is −0.57 degrees, while in the case of the beam of the motorway type, the projection angle observed between the horizon line and the first segment is −0.34 degrees;

a second part 112, and respectively 122, which takes the form of a segment inclined by approximately 15 degrees with respect to the horizontal, passing through the horizon line 104;

a third part 113, and respectively 123, which takes the form of a second horizontal flat segment disposed slightly above the horizon line 104.

Such cutoff lines make it possible not to dazzle the drivers being passed in the opposite direction or followed, by maintaining the cutoff line below the horizon line on the left-hand part of the road, whilst offering a larger area of illuminated space on the right-hand part of the road. Conversely, the cutoff line 103 of the beam of the main-beam type, situated appreciably above the horizon line, causes a dazzling of the driver being followed or passed. This type of function is therefore used only under particular conditions, especially in the absence of vehicles being followed or passed.

The beam of the motorway type therefore corresponds to a beam of the dipped type where the horizontal part of the cutoff line has been raised (on the left of the vehicle for driving on the right) but also where the light intensity has been increased. The motorway function can be fulfilled by means of various types of headlight devices. A first example embodiment lies in the existence of a bender on the previously mentioned cover, acting in the dual-function devices. A bender corresponds to a part of the cover that takes the horizontal position, oriented towards the light source of the headlight device in question, when the cover is positioned so as to intercept part of the light rays produced by the light source. The bender then makes it possible to reflect part of the light rays that would have been intercepted by the cover in the absence of the bender, thus increasing the light intensity emitted and raising the light beam produced compared with the light beam produced by a conventional dipped beam.

A second example embodiment of a headlight device for performing a motorway function is shown schematically in FIG. 2. A projection of the light beam produced by such a headlight device is shown in FIG. 3. In FIG. 2, a headlight device P comprises a first optical module M1 and a second optical module M2. Optical module means here an optical system comprising at least one light source, possibly disposed in a reflector, and possibly associated with one or more dioptric elements of the lens type; the light source can for example be implemented by one or more light emitting diodes grouped together, or by a halogen or xenon lamp in a reflector; the optical system in question is preferably self-contained, that is to say able to be switched on or off separately from the other modules of the headlight.

In this example, the first module M1 is for example able to perform the conventional dipped function; it therefore reproduces the previously described cutoff line 101. The first module M1 can also be a dual-function dipped/main-beam module. The second module M2 is a complementary module; for example, the second module can comprise one or more light emitting diodes, or LEDs, and a lens providing an at least partially flat cutoff line; in other example embodiments, other light sources than LEDs are used to produce the second module M2.

The activation of the second module M2, if it occurred without the activation of the first module M1, would produce a light beam whose projection 300 would be roughly rectangular or trapezoidal in shape, slightly below the horizon line 104; the projection angle observed between the horizon line and a higher line 301 of the light projection 300 is typically −0.34 degrees. The activation of the second module M2 combined with the activation of the first module M1 therefore generates a light beam whose overall shape is similar to that of a dipped beam, but with a cutoff line 302, shown in bold in FIG. 3, raised at least on the left hand part of the road, and whose light intensity is increased, compared with the light intensity of a dipped beam, close to the cutoff line of the global beam produced. Such a global beam can therefore be used to perform the motorway function.

Other examples of headlight devices for producing a beam of the motorway type exist in the prior art, for example multifunction headlight devices that comprise a light source and a movable cover selectively obscuring part of the light flux emitted by the source, thus making it possible to perform the dipped, main beam and motorway functions. In the invention, it will be possible to use any type of device able to produce at least one light beam of the conventional dipped type and a light beam of the motorway type; advantageously, the headlight devices used will be able to produce also light beams of the main-beam type.

For the general purpose of improving the driving comfort in terms of visibility, there exist, in the prior art, dual-function modules where the switching from dipped function to main beam function, and vice versa, is automatic, and the switching depending on the traffic conditions. With vehicles equipped with such dual-function modules, the presence of a vehicle liable to be dazzled by use of the main-beam function is sought. If no vehicle is detected, the main-beam function is automatically activated. As soon as the presence of a vehicle is detected, the main-beam function is automatically deactivated and the vehicle equipped with the dual-function headlight once again presents a light beam of the dipped type.

In practice, the threshold value as from which the absence of a vehicle detected allows switching to the main-beam function is fixed at 600 meters. As soon as a vehicle is detected at less than 600 meters from the equipped vehicle, it is the dipped function that is activated. However, this function provides fully satisfactory lighting only over a distance of around 60 to 80 meters. There therefore exist many traffic configurations, those in which the first vehicle liable to be dazzled is situated at more than 100 meters and at less than 600 meters from the equipped vehicle, for which the illumination of the road could be optimized without for all that dazzling the driver of any other vehicle.

SUMMARY OF THE INVENTION

An object of the invention is to respond to the problems that have just been mentioned. In the invention, it is proposed to illuminate optimally, or at least in an improved fashion compared with existing solutions, a road taken by a vehicle in question implementing the method according to the invention, whilst ensuring that other vehicles are not dazzled. For this purpose, it is proposed, in the invention, to detect the distance between the vehicle in question and the first vehicle liable to be dazzled by the vehicle in question, and to generate accordingly a light beam optimized in terms of range on the road, and advantageously also in terms of light intensity; according to the invention, optimization of the light beam produced is achieved by the use of the motorway function available on the vehicle in question. The use of this function in this context also provides a relatively gradual transition between the function of the dipped type and the function of the main-beam type in the context of automatic switching operations between these functions.

Advantageously, it is proposed in the invention to modify the light distribution and/or to offset the light beam produced by the motorway function according to the relative positions of the vehicles. Offset beam means a beam where the principal direction of the beam, that is to say the direction in which the light intensity emitted is at a maximum, has been reoriented, but without substantially modifying the angular distribution with respect to the form of the beam in question.

The invention therefore concerns essentially a method for the automatic adaptation of a light beam of a headlight device of a first motor vehicle traveling on a road, the headlight device being able to perform a lighting function of the dipped beam type producing a light beam of the dipped type, and a lighting function of the motorway type producing a light beam of the motorway type, the lighting function of the dipped beam type being activated, comprising the steps of:

detecting the presence of at least a second vehicle, being followed or passed in the opposite direction, not to be dazzled;

estimating an instantaneous distance separating the first vehicle from the second vehicle;

determining whether the estimated instantaneous distance is greater than a first threshold value, referred to as the threshold value for activating the motorway lighting function; where necessary, activating the motorway lighting function.

The method according to the invention can also have, in addition to the principal characteristics stated in the previous paragraph, one or more of the following complementary characteristics; any combination of these complementary characteristics, in so far as they are not mutually exclusive, constitute an advantageous example embodiment of the invention:

the method comprises the various supplementary steps of, after activation of the lighting function of the motorway type:

estimating a new distance separating the first vehicle from a third vehicle not to be dazzled;

determining whether the new estimated distance is less than a second threshold value, referred to as the threshold value for deactivating the motorway lighting function; where necessary, deactivating the lighting function of the motorway type;

the method comprises the supplementary steps of:

determining the nature of the vehicle not to be dazzled by establishing whether the vehicle not to be dazzled is a vehicle being passed in the opposite direction or a vehicle being followed;

adapting the first threshold value and/or the second threshold value according to the determination of the nature of the vehicle;

the vehicle not to be dazzled is the vehicle closest to the first vehicle;

the second vehicle and the third vehicle are a single vehicle;

the first threshold value and the second threshold value are identical;

the first threshold value is substantially greater than the second threshold value;

the first threshold value depends on the character, passed or followed, of the second vehicle;

the second threshold value depends on the character, passed or followed, of the third vehicle;

the step of activating the lighting function of the motorway type comprises in particular a first operation of modulating a supplementary light power added to a light power available for performing the lighting function of the dipped beam type;

the step of activating the lighting function of the motorway type comprises in particular a second operation of shifting, towards the optical axis of the headlight device observed when it produces solely the beam of the motorway type, an axis of maximum intensity of the light beam of the motorway type;

the step of activating the lighting function of the motorway type comprises in particular a third operation of shifting upwards a complementary light beam produced during the activation of the lighting function of the motorway type;

the step of activating the lighting function of the motorway type comprises in particular a fourth operation of shifting upwards the light beam of the motorway type;

the modulation and shifting operations are implemented gradually, according to the distance assessed between the first vehicle and the vehicle not to be dazzled, in order to optimize the lighting of the road. Optimization of the lighting of the road means increasing, at least at certain points, the light intensity of the light beam produced and/or illumination of the road as far as possible without for all that causing the dazzling of the opposing drivers;

the first operation; or the second operation; or either the third operation or the fourth operation; are performed if the estimated instantaneous distance is greater respectively than a first reference value, a second reference value or a third reference value, with the third reference value greater than the second reference value and the second reference value greater than the first reference value;

the headlight device consists of a first optical module able to perform the dipped beam function and a second optical module involved in the performance of the motorway function, the first optical module and the second optical module being self-contained, the second optical module comprising in particular a light source, a lens and a dedicated motor able to cause a relative movement between the lens and the light source;

the headlight device consists of a first optical module able to perform the dipped beam function and a second optical module involved in the performance of the motorway function, the first optical module and the second optical module being self-contained, the second optical module comprising in particular a semiconductor light source with a substantially rectangular shape, an exit mirror generating by itself a light beam with cutoff and a dedicated motor able to cause a rotation of the exit mirror about an axis containing one of the edges of the source rectangle;

the headlight device is able to perform a main-beam function, the main-beam function being activated automatically when the estimated instantaneous distance is greater than a third threshold value greater than the first threshold value.

Another object of the invention is a motor vehicle able to implement the method according to the invention with its previously stated principal characteristics, and possibly one or more complementary characteristics that have just been mentioned.

The invention and its various applications will be understood better from a reading of the following description and an examination of the figures that accompany it.

BRIEF DESCRIPTION OF THE DRAWINGS

These are presented only by way of indication and are no way limitative of the invention.

DESCRIPTION OF PREFERRED EMBODIMENTS

Figure 1:
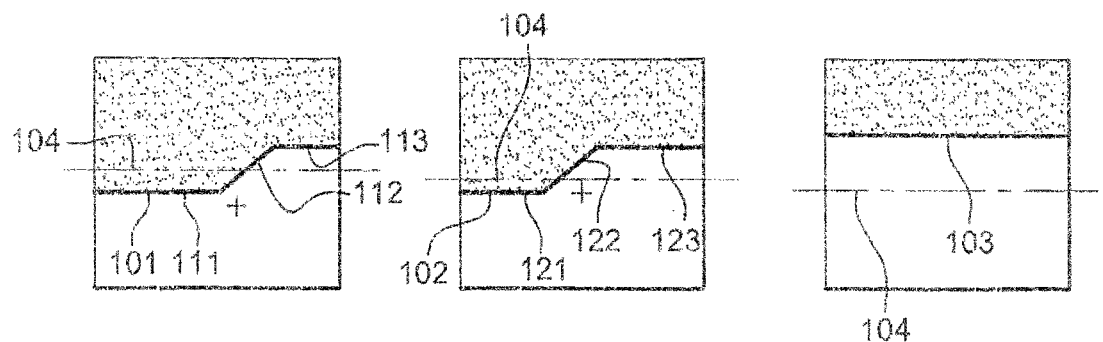
FIG. 1, already described, is a schematic representation of various light beam cutoffs.

The elements appearing in various figures, unless otherwise specified, keep the same references.

To enable a vehicle implementing the method according to the invention—which will be designated in the remainder of the document as the first vehicle—to optimize the illumination of a road without dazzling any opposing vehicles, being passed or followed, it is necessary firstly to determine the presence of these other vehicles and to evaluate an instantaneous distance existing between the first vehicle and a vehicle not to be dazzled. Vehicle not to be dazzled means the vehicle whose driver would be dazzled first by the production by the first vehicle of an unsuitable light beam. The vehicle not to be dazzled may of course change over time: it is entirely possible to determine firstly a vehicle, designated as the second vehicle, as being the vehicle not to be dazzled and then secondly, following for example the appearance of a new vehicle designed as the third vehicle, to consider the third vehicle as being the third vehicle not to be dazzled.

In order to determine the presence of other vehicles and to estimate an instantaneous distance with these vehicles, the use of known distance evaluation means is provided for; these various means may for example consist of:
- a camera associated with image processing means making it possible to locate the headlight devices of the other vehicles; the evaluation of the distance between the headlight devices of any one vehicle makes it possible to determine the distance between the vehicle in question and the first vehicle, the distance varying proportionately to the distance; or
- a lidar; or
- a stereoscopic system based on the use of two cameras.

In order to increase the precision in measuring the distance between the first vehicle and the other vehicles, several of these means can be used conjointly.

Advantageously, means of identifying the nature of the other vehicles, relating to the passed or followed character of these other vehicles, are used in certain embodiments of the method according to the invention. Such identification means use for example image processing algorithms that make it possible to distinguish the red or white colors of the lights, corresponding respectively to the rear or front lights of the vehicles, or image processing algorithms for monitoring paths.

In the invention, provision is made for equipping the vehicle in question with a computer, any image acquisition means, and any image processing and/or vehicle detection means able to be involved in the implementation of the method according to the invention.

In a first example embodiment of the invention, the vehicles being followed and the vehicles being passed in the opposite direction are distinguished between. In general terms, the motorway function is activated as soon as the instantaneous distance evaluated, between the first vehicle and the vehicle not to be dazzled, reaches or exceeds a first threshold value, referred to as the motorway function activation threshold value. In the first example, a first threshold value is defined for the vehicles being passed in the opposite direction and a first threshold value for the vehicles being followed. For example, for the vehicles being passed, the first threshold value is around 200 meters, while for the vehicles being followed it is around 150 meters. Such a difference is justified by the fact that a vehicle being passed will approach the first vehicle more rapidly than the vehicle being followed; with a vehicle being passed in the opposite direction an activation of the motorway function for a relatively small instantaneous distance would cause the deactivation—as will be explained subsequently—of this function almost immediately, which will give the impression of a call for the headlight not caused by the driver of the vehicle, and therefore a nuisance.

If the equipment of the first vehicle detects the simultaneous presence of a vehicle being passed in the opposite direction and a vehicle being followed, the first threshold value evaluated that is taken into consideration in causing or not the activation of the motorway function is the largest threshold value.

In a second example of implementation of the invention, the vehicles being passed in the opposite direction and the vehicles being followed are not distinguished between. In this case, the first threshold value is the only one, for example equal to 200 meters. The vehicle not to be dazzled is then the vehicle detected closest to the first vehicle.

Advantageously, provision is made in the invention for automatically deactivating the motorway function when the instantaneous distance evaluated becomes less than a second threshold value, referred to as the motorway function deactivation threshold value. In a particular example, the second threshold value is substantially less, for example by around 20 meters, in the case of a vehicle being followed and by around 50 meters in the case of a vehicle being passed in the opposite direction, than the first threshold value. Such a precaution avoids activation and deactivation operations that are too close together in time, which could impair driving comfort.

Advantageously, in the invention, the determination of a third threshold value is provided for; if the instantaneous distance measured between the first vehicle and the vehicle not to be dazzled is greater than the third threshold value, an automatic switching of light beam takes place in order to activate the main-beam function. In certain example embodiments, provision is made for making a distinction between the vehicles being passed in the opposite direction and the vehicles being followed; in the first case, the third threshold value is around 600 meters and in the second case it is around 350 meters.

The method according to the invention as just described through various examples therefore proposes to improve the illumination of the road under certain driving conditions directly related to the traffic, by proposing the use of an intermediate function of the motorway function type. The use of this function then offers a level of illumination intermediate between the dipped function and the main-beam function.

In various embodiments of the method according to the invention, it is advantageously proposed to make the light beam of the motorway type change in order to adapt progressively to the actual travel conditions in terms of traffic. Such an example embodiment is illustrated schematically in FIG. 4, which shows a first vehicle 400 able to implement the method according to the invention and a vehicle being followed 401.

For example, it is proposed to define a first reference threshold R1 (FIG. 4), a second reference threshold R2 and a third reference threshold R3 that represent instantaneous distance values evaluated, belonging to the range of use of the motorway function lying between the first threshold value S1 and the third threshold value S3; from these reference values, a specific operation is performed in order to optimize the illumination of the road by making a motorway-type beam change.

Figure 2:
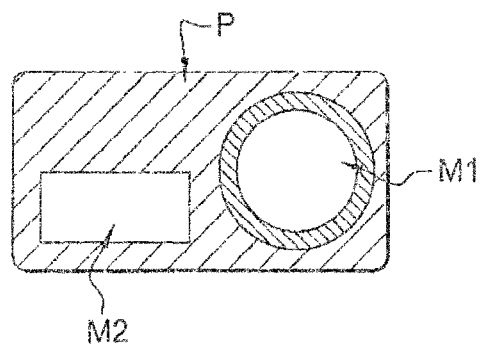
FIG. 2, also already described, is a schematic representation of an embodiment of a headlight device for performing a motorway function.
Figure 3:
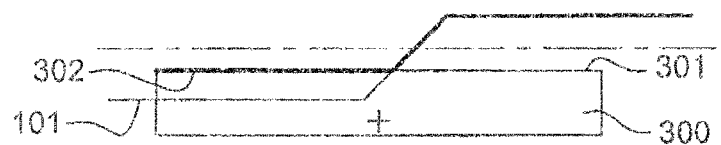
FIG. 3, already described, is a schematic representation of an example embodiment of a headlight device able to perform in particular the function of the motorway type.
Figure 4:
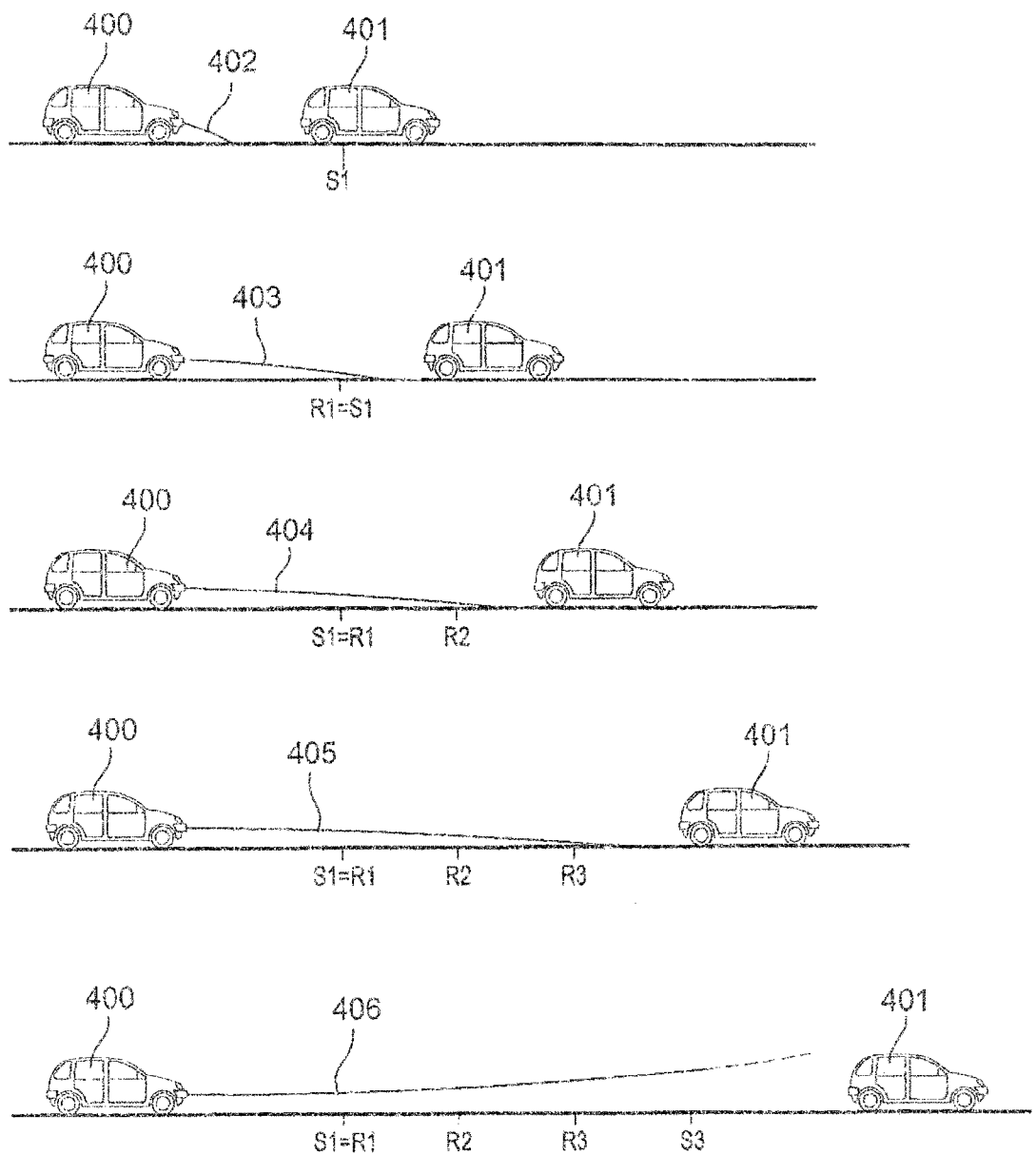
FIG. 4, is a schematic representation of a road scene illustrating for example the implementation of the method according to the invention.

As illustrated schematically in FIG. 4, as long as the first threshold value is not reached, the first vehicle 400 produced is a light beam of the dipped type 402. Once the motorway function is activated, it is proposed, as soon as the instantaneous distance determined reaches the first reference value, which may for example be equal to the first threshold value, to modulate the light intensity generated by the headlight device performing the motorway function. A first light beam 403 of the motorway type is then obtained. For example, if the headlight device is of the type shown in FIG. 2, it is proposed to gradually switch on the second module M2. The gradual switching on is an increasing function of the instantaneous distance measured; the greater the latter, the more the light intensity is increased. Advantageously, the second module M2 then comprises a light source implemented by means of several light emitting diodes.

When the instantaneous distance reaches the second reference value, a second operation is then performed consisting of shifting the light beam of the motorway type so that its principal emission direction, corresponding to the direction of maximum intensity of the light beam in question, coincides with the principal direction of emission of the headlight device in question when the latter is performing solely the dipped function. For this purpose, it is possible for example to use the means of moving the headlight devices acting in the orientable headlight devices of the dipped type, known as bending lights. The shifting performed is an increasing function of the instantaneous distance measured: the greater the latter, the greater the shifting movement. A second light beam 404 of the motorway type is then obtained.

When the instantaneous distance reaches the third reference value, a third operation is then performed consisting of shifting the light beam of the motorway type upwards, in order to increase its range. A third light beam 405 of the motorway type is then obtained. For this purpose, it is possible for example to use the attitude correction motor that, in the case of a headlight device of the type shown in FIG. 2, shifts the whole of the headlight device upwards. Advantageously, provision is made for equipping the headlight device with means of vertical movement of the light being produced by the second optical module M2 without acting on the position of the light being produced by the first optical module. For example, the use of a dedicated motor different from the attitude correction motor is provided for, the dedicated motor providing a relative vertical movement between the lens and the light source of the second optical module M2.

Provision can also be made for implementing the module M2 by means of an optical system comprising a semiconductor light source with a substantially rectangular shape and at least one exit mirror generating by itself a light beam with cutoff, for example, a parabolic cylinder whose axis contains one of the sides of the emissive rectangle. In this case, the means of vertical movement of the light beam produced by the optical module M2 that has just been described can use a dedicated motor also different from the attitude correction motor, the dedicated motor providing a rotation of the exit reflector about an axis containing one of the edges of the emissive rectangle. This makes it possible to move the whole of the beam emitted by the module M2 without deforming it.

There also, the progressive upward shifting of the light beam of the motorway type is an increasing function of the instantaneous distance measured: the greater the latter, the greater the shift observed.

In a particular example, the first reference value is lower than the second reference value, itself lower than the third reference value. However, in certain examples provision is made for the various operations that have just been mentioned to begin while the previous operation has not ended and is continuing.

When the given distance is greater than the third threshold value S3, the main-beam function is activated; it produces a beam 406 going beyond the horizon line.

While the system and method herein described constitute preferred embodiments of this invention, it is to be understood that the invention is not limited to this precise system and method, and that changes may be made therein without departing from the scope of the invention which is defined in the appended claims.

What is claimed is:

1. A method for the automatic adaptation of a light beam of a headlight device of a first motor vehicle traveling on a road, the headlight device being able to perform a lighting function of the dipped beam type producing a light beam of the dipped type, and a lighting function of the motorway type producing a light beam of the motorway type, the lighting function of the dipped beam type being activated, wherein it comprises the steps of:

detecting the presence of at least a second vehicle, being followed or passed in the opposite direction, not to be dazzled;
   estimating an instantaneous distance separating the first vehicle from the second vehicle; and
   determining whether the estimated instantaneous distance is greater than a first threshold value, referred to as the threshold value for activating the motorway lighting function; where necessary, activating the motorway lighting function;
   wherein the vehicle not to be dazzled is the vehicle closest to the first vehicle.

2. The method according to claim 1, wherein it comprises the various supplementary steps of, after activation of the lighting function of the motorway type:

estimating a new distance separating the first vehicle from a third vehicle not to be dazzled;
   determining whether the new estimated distance is less than a second threshold value, referred to as the threshold value for deactivating the motorway lighting function; where necessary, deactivating the lighting function of the motorway type.

3. The method according to claim 2, wherein the first threshold value and the second threshold value are identical.

4. The method according to claim 2, wherein the first threshold value is substantially greater than the second threshold value.

5. The method according to claim 2, wherein the second vehicle and the third vehicle are a single vehicle.

6. The method according to claim 2, wherein said second threshold value depends on the character, passed or followed, of the third vehicle.

7. The method according to claim 1, wherein the step of activating the lighting function of the motorway type comprises in particular a fourth operation of shifting upwards the light beam of the motorway type.

8. The method according to claim 1, wherein the headlight device consists of a first optical module able to perform the dipped beam function and a second optical module involved in the performance of the motorway function, the first optical module and the second optical module being self-contained, the second optical module comprising in particular a light source, a lens and a dedicated motor able to cause a relative movement between the lens and said light source.

9. The method according to claim 1, wherein the headlight device consists of a first optical module able to fulfill the dipped beam function and a second optical module involved in the performance of the motorway function, the first optical module and the second optical module being self-contained, the second optical module comprising in particular a semiconductor light source with a substantially rectangular shape, an exit mirror generating by itself a light beam with cutoff and a dedicated motor able to cause a rotation of the exit mirror about an axis containing one of the edges of the source rectangle.

10. The method according to claim 1, wherein the headlight device is able to perform a main-beam function, said main-beam function being activated automatically when the estimated instantaneous distance is greater than a third threshold value greater than the first threshold value.

11. A motor vehicle able to implement the method according to claim 1.

12. A method for the automatic adaptation of a light beam of a headlight device of a first motor vehicle traveling on a road, the headlight device being able to perform a lighting function of the dipped beam type producing a light beam of the dipped type, and a lighting function of the motorway type producing a light beam of the motorway type, the lighting function of the dipped beam type being activated, wherein it comprises the steps of:
- detecting the presence of at least a second vehicle, being followed or passed in the opposite direction, not to be dazzled;
- estimating an instantaneous distance separating the first vehicle from the second vehicle; and
- determining whether the estimated instantaneous distance is greater than a first threshold value, referred to as the threshold value for activating the motorway lighting function; where necessary, activating the motorway lighting function;
- wherein the step of activating the lighting function of the motorway type comprises in particular a third operation of shifting upwards a complementary light beam produced during the activation of the lighting function of the motorway type.

13. A method for the automatic adaptation of a light beam of a headlight device of a first motor vehicle traveling on a road, the headlight device being able to perform a lighting function of the dipped beam type producing a light beam of the dipped type, and a lighting function of the motorway type producing a light beam of the motorway type, the lighting function of the dipped beam type being activated, wherein it comprises the steps of:
- detecting the presence of at least a second vehicle, being followed or passed in the opposite direction, not to be dazzled;
- estimating an instantaneous distance separating the first vehicle from the second vehicle; and
- determining whether the estimated instantaneous distance is greater than a first threshold value, referred to as the threshold value for activating the motorway lighting function; where necessary, activating the motorway lighting function;
- wherein the step of activating the lighting function of the motorway type comprises in particular a first operation of modulating a supplementary light power added to a light power available for performing the lighting function of the dipped beam type.

14. The method according to claim 13, wherein the modulation and shifting operations are implemented gradually, according to the distance assessed between the first vehicle and the vehicle not to be dazzled, in order to optimize the lighting of the road.

15. The method according to claim 13, wherein:
- a first operation of modulating a supplementary light power added to a light power available for performing the lighting function of the dipped beam type; or
- a second operation of shifting, towards the optical axis of the headlight device observed when it produces solely the beam of the motorway type, an axis of maximum intensity of the light beam of the motorway type; or
- either a third operation of shifting upwards a complementary light beam produced during the activation of the lighting function of the motorway type or a fourth operation of shifting upwards the light beam of the motorway type;
- are performed if the estimated instantaneous distance is greater respectively than a first reference value, a second reference value or a third reference value, with the third reference value greater than the second reference value and the second reference value greater than the first reference value.

16. A method for the automatic adaptation of a light beam of a headlight device of a first motor vehicle traveling on a road, the headlight device being able to perform a lighting function of the dipped beam type producing a light beam of the dipped type, and a lighting function of the motorway type producing a light beam of the motorway type, the lighting function of the dipped beam type being activated, wherein it comprises the steps of:
- detecting the presence of at least a second vehicle, being followed or passed in the opposite direction, not to be dazzled;
- estimating an instantaneous distance separating the first vehicle from the second vehicle; and
- determining whether the estimated instantaneous distance is greater than a first threshold value, referred to as the threshold value for activating the motorway lighting function; where necessary, activating the motorway lighting function;
- wherein the step of activating the lighting function of the motorway type comprises in particular a second operation of shifting, towards the optical axis of the headlight device observed when it produces solely the beam of the motorway type, an axis of maximum intensity of the light beam of the motorway type.

17. A method for the automatic adaptation of a light beam of a headlight device of a first motor vehicle traveling on a road, the headlight device being able to perform a lighting function of the dipped beam type producing a light beam of the dipped type, and a lighting function of the motorway type producing a light beam of the motorway type, the lighting function of the dipped beam type being activated, wherein it comprises the steps of:
- detecting the presence of at least a second vehicle, being followed or passed in the opposite direction, not to be dazzled;
- estimating an instantaneous distance separating the first vehicle from the second vehicle; and
- determining whether the estimated instantaneous distance is greater than a first threshold value, referred to as the threshold value for activating the motorway lighting function; where necessary, activating the motorway lighting function;
- wherein said first threshold value depends on the character, passed or followed, of the second vehicle.

18. A method for the automatic adaptation of a light beam of a headlight device of a first motor vehicle traveling on a road, the headlight device being able to perform a lighting function of the dipped beam type producing a light beam of the dipped type, and a lighting function of the motorway type producing a light beam of the motorway type, the lighting function of the dipped beam type being activated, wherein it comprises the steps of:
- detecting the presence of at least a second vehicle, being followed or passed in the opposite direction, not to be dazzled;
- estimating an instantaneous distance separating the first vehicle from the second vehicle; and
- determining whether the estimated instantaneous distance is greater than a first threshold value, referred to as the threshold value for activating the motorway lighting function; where necessary, activating the motorway lighting function;
- wherein said method further comprises the steps of:
- determining the nature of the vehicle not to be dazzled by establishing whether the vehicle not to be dazzled is a vehicle being passed in the opposite direction or a vehicle being followed;

adapting the first threshold value and/or the second threshold value according to the determination of the nature of the vehicle.

19. An automatic adaptation of a light beam system for automatically adapting a headlight device of a first motor vehicle traveling on a road, the headlight device being able to perform a lighting function of the dipped beam type producing a light beam of the dipped type, and a lighting function of the motorway type producing a light beam of the motorway type, the lighting function of the dipped beam type being activated, wherein said system comprises:

vehicle detecting means for detecting the presence of at least a second vehicle, being followed or passed in the opposite direction, not to be dazzled;

estimating means for estimating an instantaneous distance separating the first vehicle from the second vehicle; and determining means for determining whether the estimated instantaneous distance is greater than a first threshold value, referred to as the threshold value for activating the motorway lighting function; where necessary, activating the motorway lighting function;

wherein the vehicle not to be dazzled is the vehicle closest to the first vehicle.

20. The automatic adaptation of a light beam system according to claim 19, wherein the first threshold value depends on the character, passed or followed, of the second vehicle.

21. The automatic adaptation of a light beam system according to claim 19, wherein after activation of the lighting function of the motorway type said estimating means estimates a new distance separating the first vehicle from a third vehicle not to be dazzled;

said determining means determines whether the new estimated distance is less than a second threshold value, referred to as the threshold value for deactivating the motorway lighting function; where necessary, deactivating the lighting function of the motorway type.

22. The automatic adaptation of a light beam system according to claim 19, wherein said method further comprises the steps of:

said determining means determines the nature of the vehicle not to be dazzled by establishing whether the vehicle not to be dazzled is a vehicle being passed in the opposite direction or a vehicle being followed;

wherein said determining means adapts the first threshold value and/or the second threshold value according to the determination of the nature of the vehicle.

23. The automatic adaptation of a light beam system according to claim 21, wherein the second threshold value depends on the character, passed or followed, of the third vehicle.

24. The automatic adaptation of a light beam system according to claim 21, wherein the second vehicle and the third vehicle are a single vehicle.

25. The automatic adaptation of a light beam system according to claim 21, wherein the first threshold value and the second threshold value are identical.

26. The automatic adaptation of a light beam system according to claim 21, wherein the first threshold value is substantially greater than the second threshold value.

* * * * *